May 27, 1952　　　　H. R. KIEHL　　　　2,597,935
COVER GLASS ASSEMBLY
Filed April 22, 1946

Inventor
HARRY R. KIEHL

By Knight & Fowler
Attorneys

Patented May 27, 1952

2,597,935

UNITED STATES PATENT OFFICE 2,597,935

COVER GLASS ASSEMBLY

Harry Ray Kiehl, Corning, N. Y., assignor to Corning Glass Works, Corning, N. Y., a corporation of New York Application April 22, 1946, Serial No. 663,785

1 Claim. (Cl. 58—91)

The present invention relates to convex-concave cover-glasses and particularly to their application in sealing relation to watch or other instruments bezels. It has been the usual custom in the past to employ a cover-glass of such diameter with respect to the opening of a bezel as to permit snapping the glass into place by slight springing of the bezel. This practice is open to several objections. For example, if the fit is particularly tight, fracture or at least checking of the margin of the cover-glass is likely to result. If there is too much clearance, the bezel fails to properly hold the cover-glass. Even under ideal conditions the fit between the cover-glass and bezel is far from being vapor and dust tight and accordingly does not give complete protection to the interior of the instrument. In addition, in the absence of a snug fit between the margin of the cover-glass and the bezel, the cover-glass has less resistance to breakage by pressure or impact than is the case when the cover-glass is rigidly supported by the bezel.

The prime object of the present invention is a cover-glass of convex-concave form hermetically sealed into a bezel and highly resistant to mechanical impact and/or abrasion.

Another object is a cover-glass bezel combination wherein the minimum diameter tolerance of the cover-glass with respect to the bezel opening is less critical than when a snap fit is required.

Figure 1:
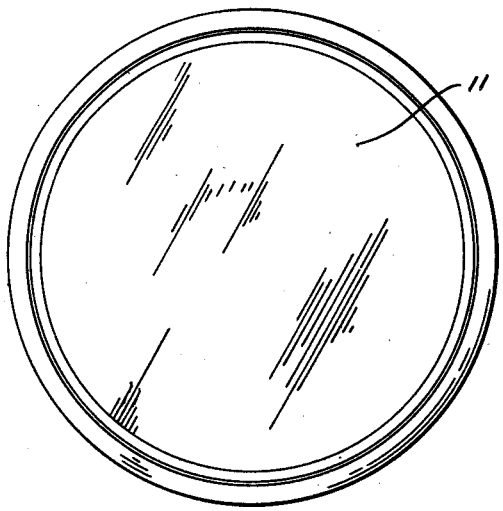
Figure 2:
Figure 3:
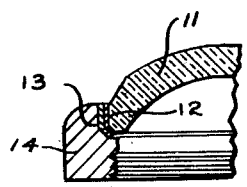

Fig. 1 of the accompanying drawing is a top view of a typical convex-concave cover-glass and bezel assembly embodying the invention;

Fig. 2 is an elevational view of the assembly with the bezel shown in section, and Fig. 3 is an enlarged fragmentary sectional view of the assembly.

Referring to the drawing in detail, 11 designates the cover-glass, 12 a metallic coating, and 13 the solder intimately bonding the metallic coating to the bezel 14.

In the initial attempt to provide an assembly satisfying the foregoing objectives the marginal surface of an annealed convex-concave cover-glass was metallized and then soldered into intimate contact with a bezel. It was found, however, that the bezel on cooling contracted and in so doing applied a permanent circumferential compressive force to the margin of the glass and, owing to the convex-concave shape of the glass, established tensional forces in its convex surface. Since it is the convex surface which is exposed to abrasion and mechanical impact the assembly, though vapor and dusttight, was wholly unsatisfactory owing to its lack of resistance to abrasion. The problem was finally solved by highly tempering the cover glass.

Tempering of glass establishes compressive forces in its surfaces, as is well known, by reason of more rapid cooling of the surfaces than of the interior, whereby the surfaces shrink into a state of compression as the interior subsequently cools. Thus, when circumferential pressure is applied to the margin of the concave-convex cover-glass by contraction of the bezel on cooling, such pressure tends to stretch the convex surface of the cover-glass, thus tending to decrease the state of compression therein. On the other hand such applied pressure tends to compress the concave surface to a smaller diameter, thereby increasing its state of compression.

It has been found that when the foregoing procedure is followed the cover-glass assembly is not only vapor and dusttight but, additionally the glass is far more resistant to breakage by mechanical impact than are cover-glasses of conventional assemblies. This is attributed to the fact that the cover-glass is rigidly supported at the instant that impact or pressure is applied thereto, and also to the fact that the convex surface of the cover-glass, owing to its original high state of compression, remains under substantial compression in spite of the counter force established therein on cooling of the bezel.

What is claimed is:

In a cover-glass assembly, a tempered convex-concave cover-glass having a permanent compressive stress established in the convex surface thereof and having its marginal portion metallized, a bezel contracted about such marginal portion, and solder between the bezel and such metallized portion, the compressive stress in said convex surface being greater than the tensional stress created therein by contraction of the bezel.

HARRY RAY KIEHL.

REFERENCES CITED

The following references are of record in the file of this patent:

UNITED STATES PATENTS

| Number | Name | Date |
|---|---|---|
| 1,613,276 | Hill | Jan. 4, 1927 |
| 2,050,576 | Kronquest | Aug. 11, 1936 |
| 2,075,477 | Smith | Mar. 30, 1937 |